(12) United States Patent
Yoshida et al.

(10) Patent No.: US 6,641,901 B2
(45) Date of Patent: Nov. 4, 2003

(54) PERPENDICULAR-MAGNETIC RECORDING MEDIA AND MAGNETIC RECORDING APPARATUS

(75) Inventors: Kazuetsu Yoshida, Hidaka (JP); Masaaki Futamoto, Shiroyama (JP); Yoshiyuki Hirayama, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/340,597

(22) Filed: Jan. 13, 2003

(65) Prior Publication Data

US 2003/0143433 A1 Jul. 31, 2003

Related U.S. Application Data

(63) Continuation of application No. 09/811,471, filed on Mar. 20, 2001, now Pat. No. 6,528,149.

(30) Foreign Application Priority Data

May 29, 2000 (JP) ........................................ 2000-163150

(51) Int. Cl.$^7$ .................. H01F 10/00; H01F 10/10; H01F 10/16; B11B 5/66
(52) U.S. Cl. .................. 428/212; 428/457; 428/668; 428/694 T; 428/694 TS; 428/694 EC; 428/694 TM; 428/694 MM
(58) Field of Search .................. 428/212, 694 T, 428/694 TS, 694 EC, 668, 694 TM, 457, 694 MM

(56) References Cited

FOREIGN PATENT DOCUMENTS

| JP | 57-109127 | 7/1982 |
|----|-----------|--------|
| JP | 07-176027 | 7/1995 |
| JP | 9-91660 | 4/1997 |
| JP | 10-079307 | 3/1998 |
| JP | 10-334440 | 12/1998 |
| JP | 11-102510 | 4/1999 |
| JP | 11-283230 | 10/1999 |

OTHER PUBLICATIONS

Journal of Japanese Applied Magnetics, vol. 9, No. 2, 1985, pp. 57–60.
IEEE Transactions on Magnetics, vol. 24, No. 6, Nov. 1988, pp. 2706–2708.

*Primary Examiner*—Paul Thibodeau
*Assistant Examiner*—Nikolas J Uhlir
(74) *Attorney, Agent, or Firm*—Mattingly, Stanger & Malur, P.C.

(57) ABSTRACT

The present invention relates to perpendicular magnetic recording media using a ferromagnetic film provided with perpendicular magnetic anisotropy for a recording layer and a magnetic recording apparatus using the media, and the object is to provide the perpendicular magnetic recording media which are excellent in signal to noise ratio (S/N) in a large recording density region, which are stable against thermal fluctuation and which can be easily manufactured, and the magnetic recording apparatus using the media. The representative perpendicular magnetic recording media according to the invention include a glass substrate, a first recording layer which is provided on the substrate via an underlayer, which has perpendicular magnetic anisotropy and the magnitude of magnetic exchange interaction between grains of which is substantially zero and a second recording layer which is laminated on the first recording layer, which is provided with perpendicular magnetic anisotropy and the magnetic exchange interaction between grains of which is larger than that of the first recording layer.

3 Claims, 3 Drawing Sheets

PERPENDICULAR-MAGNETIC RECORDING MEDIA AND MAGNETIC RECORDING APPARATUS

This is a continuation application of U.S. Ser. No. 09/811,471, filed Mar. 20, 2001, now U.S. Pat. No. 6,528,149.

BACKGROUND OF THE INVENTION

1. Field of the Invention

The present invention relates to perpendicular magnetic recording media using a ferromagnetic thin film having perpendicular magnetic anisotropy for a recording layer and a magnetic recording apparatus using it.

2. Description of the Related Art

Recently, information contents have been strikingly increased and as a result, the storage capacity of a magnetic recording apparatus used for a mass storage file of a computer has been rapidly enhanced.

In magnetic recording, the recording of information is realized by inverting the orientation of magnetization in a minute region of a ferromagnetic thin film to be a recording medium. Currently, a so-called longitudinal recording type in which the orientation of magnetization is parallel to the surface of a medium is widely used. In this recording type, the density is enhanced by enhancing the coercivity of a medium or by reducing the thickness of a magnetic layer. However, the current thickness of a longitudinal recording medium is already 30 nm or less, and advanced sputtering technique by which a film having tribological strength and having few defects is formed is required for further thinning a film. In addition, to prevent signal to noise ratio from being deteriorated by enhancing the density, crystal grains forming a recording thin film are required to be made smaller. However, making grain size smaller means that the resistance against thermal disturbance is weakened and so-called thermal decay by which information recorded on a medium decays as time goes is promoted.

For a method of solving the above, a perpendicular recording in which magnetization is in a perpendicular direction to the surface of a medium in recording is proposed. In this type, material having strong magnetic anisotropy with its easy axis perpendicular direction to the surface of a film is required, and a relatively thick alloy magnetic film, typically a Co—Cr alloy thin film having the thickness of 0.01 to 0.5 $\mu$m is widely used. This recording type is excellent in that the higher recording density is, the stabler magnetization for recording becomes from the viewpoint of energy, and the recording type is essentially suitable for high density recording. In addition, this recording type has an advantage that the thickness of a film is not required to be reduced and the coercivity is not required to be enhanced to enhance recording density as is the case in longitudinal recording. In addition, it means that the volume of a micro crystal grain forming the thin film can be set to a larger value, compared with that in longitudinal recording, because the thickness of the film is not required to be reduced, which means the this recording type also has excellent resistance against thermal fluctuation.

For media for this perpendicular magnetic recording, as disclosed in Japanese Laid-Open No. 57-109127, on pp. 57 to 60 of Japan Applied Magnetic Congress Issue vol. 9 No. 2 (1985), on IEEE Trans., MAG-24, No. 6, pp. 2706 to 2708 (1988) and others, a Co—Cr alloy thin film is used and it is desirable that a non-magnetic Cr atom is segregated at the boundaries between micro crystal grains forming the medium. The reason is considered to be that corrosion resistance is enhanced by forming a region in which the density of Cr is high in a grain boundary, and that by segregating a non-magnetic Cr atom at the grain boundaries magnetic exchange interaction between grains being cut off, as in the case of longitudinal recording media, the magnetic domains are made smaller and media noise is reduced.

In the meantime, for media for perpendicular recording other than the Co—Cr alloy thin film, there is an amorphous TbFe thin film used for media for magneto-optical recording. This type of film has large magnetic anisotropy, but, exchange interaction between grains is strong quite differently from the Co—Cr film. Therefore, a magnetization curve is an ideal square and its squareness value is substantially close to one.

Generally, when magnetic recording is performed on such a film using a magnetic head, d.c. demagnetization noise is low and excellent signal to noise ratio is acquired in a low density region.

In Japanese Laid-Open No. 9-91660, a magnetic recording medium wherein a first perpendicular magnetic recording film and a second perpendicular magnetic recording film respectively different in the characteristic are laminated is disclosed.

Also, in Japanese Laid-Open No. 10-334440, a magnetic recording medium is disclosed wherein a second perpendicular magnetic recording film in which the magnetic coupling in an in-plane direction is relatively strong is formed on the surface of a Co alloy perpendicular magnetic recording film which is a main recording layer and micro magnetization fluctuation existing on the surface of the main recording layer is reduced.

Though noise is small in prior art in which the Co—Cr alloy thin film is used and a Cr atom is segregated at the grain boundaries, sufficient consideration is not given to fabrication of a medium resistant to thermal fluctuation.

Also, in prior art using an amorphous TbFe thin film used for media for magneto-optical recording, excellent signal to noise ratio is acquired in a low density region, but, sufficient consideration is not given to the fact that recording properties rapidly deteriorate when recording density becomes high.

Also, in prior art described in the Japanese published unexamined patent applications No. Hei 9-91660 and No. Hei 10-334440, the first magnetic recording film has polycrystalline structure, but, the second magnetic recording film has multilayer structure or amorphous structure and the structure of the two films is considerably different and sufficient consideration is not given to industrial manufacturing facility.

SUMMARY OF THE INVENTION

The object of the invention is to provide perpendicular magnetic recording media which has excellent signal to noise ratio in a wide recording density region, also has stable properties against thermal fluctuation and can be easily manufactured, and a magnetic recording apparatus using them.

One means to achieve the object is to use perpendicular magnetic recording media according to the invention which include a non-magnetic substrate, a first recording layer which is provided on the non-magnetic substrate, which has perpendicular magnetic anisotropy and in which he magnitude of magnetic exchange interaction between grains is substantially zero, and a second recording layer which is laminated on the first recording layer, which has perpendicular magnetic anisotropy and in which magnetic exchange interaction between grains is larger than that in the first recording layer.

It is desirable that an exchange stiffness constant between grains of the first recording layer is $0.05 \times 10^{-11}$ J/m or less and an exchange stiffness constant between grains of the second recording layer is in a range of $0.15 \times 10^{-11}$ J/m to $0.8 \times 10^{-11}$ J/m. The lower limit of the exchange stiffness constant between grains of the first recording layer may be also zero, however, as it is difficult to find a magnetic film the exchange stiffness constant of which is zero, it is desirable that the exchange stiffness constant is $0.0001 \times 10^{-11}$ J/m or more. Also, it is desirable that the magnetic anisotropy constant of the second recording layer is in a range of $2.5 \times 10^5$ J/m$^3$ to $4.5 \times 10^5$ J/m$^3$. Further, it is desirable that the second recording layer has polycrystalline structure.

Another means to achieve the object according to use perpendicular magnetic recording media according to this invention which include a non-magnetic substrate, a first recording layer provided on the non-magnetic substrate and provided with perpendicular magnetic anisotropy and a second recording layer laminated on the first recording layer and provided with perpendicular magnetic anisotropy. The exchange stiffness constant, which shows the magnitude of magnetic exchange interaction between grains of the first recording layer, is $0.05 \times 10^{-11}$ J/m or less and $0.0001 \times 10^{-11}$ J/m or more.

It is desirable that an exchange stiffness constant between grains of the second recording layer is in a range of $0.15 \times 10^{-11}$ J/m to $0.8 \times 10^{-11}$ J/m.

Still other means to achieve the object is to use perpendicular magnetic recording media according to this invention which include a non-magnetic substrate, a first recording layer which is provided on the non-magnetic substrate, which is a magnetic film mainly made of Co and Cr, which has perpendicular magnetic anisotropy and the magnitude of magnetic exchange interaction between grains of which is substantially zero, and a second recording layer laminated on the first recording layer and provided with perpendicular magnetic anisotropy. The Cr is segregated at the grain boundaries between ferromagnetic grains in the first recording layer, and the Cr density is in a range of 21 atomic percents to 29 atomic percents.

It is desirable that an exchange stiffness constant between grains in the first recording layer is $0.05 \times 10^{-11}$ J/m or less. The lower limit of the value may be also zero, however, as it is difficult to find a magnetic film the exchange stiffness constant of which is zero, it is desirable that the exchange stiffness constant is $0.0001 \times 10^{-11}$ J/m or more.

Also, it is desirable that the second recording layer is a magnetic film mainly made of Co and Cr and an exchange stiffness constant between grains is in a range of $0.15 \times 10^{-11}$ J/m to $0.8 \times 10^{-11}$ J/m. It is desirable that Cr is segregated at the grain boundaries between ferromagnetic grains in the second recording layer, and the Cr density is in a range of 16 atomic percents to 19 atomic percents.

In all perpendicular magnetic recording media described above, it is desirable that the sum of the thickness of the first recording layer and the thickness of the second recording layer is 10 to 100 nm and the ratio of the thickness of the second recording layer to the thickness of the first recording layer is in a range of 0.5 to 1.0. The first recording layer is mainly made of Co and Cr, and Ta, B or Pt may be added. The second recording layer may be made of Co, Cr and Pt.

DETAILED DESCRIPTION OF THE PREFERRED EMBODIMENTS

Referring to he drawings, embodiments of the invention will be described below.

First Embodiment

Figure 1:
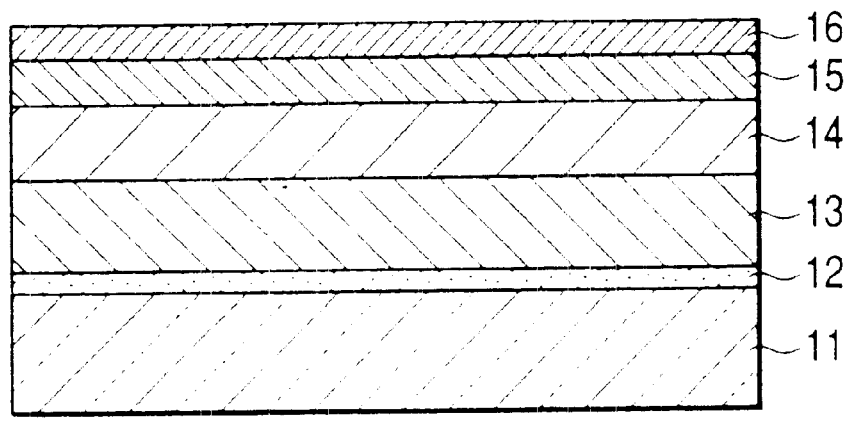
FIG. 1 shows the sectional structure of perpendicular magnetic recording media equivalent to the first embodiment of the invention.

A magnetic recording medium having sectional structure shown in FIG. 1 is produced by a d.c. magnetron sputtering method using a glass substrate 11 having a diameter of 2.5 inches. First, for an adhesive layer 12, an Hf film 10 nm thick is formed, for an underlayer 13, an Ni—Fe film (the percentage content of Fe: 20%) having high permeability characteristics is formed on the Hf film so that the Ni—Fe film has the thickness of 0.07 $\mu$m, further, a first recording layer 14 having the composition Co 78%, Cr 18% and Ta 4% and having the thickness of 15 nm is formed on the Ni—Fe film, next, a second recording layer 15 having the composition Co 70%, Cr 15% and Pt 15% and having the thickness of 10 nm is formed and finally, a carbon passivation film 16 having the thickness of 2 nm is formed on the surface. As for the temperature of the substrate, five types of recording media are produced wherein the temperature of the substrate is fixed to 250° C. until the first recording layer is formed and the temperature of the substrate when the second recording layer is formed is 100° C., 150° C., 200° C., 250° C. and 300° C. These samples are named A1 through A5 in order of the temperature of the substrate in which the lowest temperature one comes first. The second recording layer has polycrystalline structure.

Further, as a control sample for comparison, a recording medium R1 is produced having the same structure as the recording media described above except that a recording layer is formed by only a magnetic film having the same composition (Co 78%, Cr 18% and Ta 4%) as the first recording layer and the second recording layer is not provided. Similarly, a recording medium R2 produced the recording layer of which is formed by only a magnetic film having the same composition (Co 70%, Cr 15% and Pt 15%) as the second recording layer. The temperature of the substrate when R1 is produced is 250° C., the thickness of the recording layer is 25 nm, the temperature of the substrate when R2 is produced is 200° C. and the thickness of the recording layer is similarly 25 nm.

As the samples produced as described above are multilayer ferromagnetic films, the magnetic properties of each recording layer cannot be individually measured. For reference, magnetic properties are shown in Table 1 when various recording films are formed by 25 nm after a Ti—Cr layer (the percentage content of Cr: 10%) 10 nm thick is formed on a glass substrate as a crystallographic orientation control layer are shown The coercivity (Hc) and the saturation magnetization (Is) are measured using a vibrating sample magnetometer (VSM). Further, composition distribution in a grain boundary of each sample measured using an energy filtering transmission electron microscopy is also shown in Table 1. The magnitude of an exchange stiffness constant (A) in a grain boundary of each sample is also shown which is acquired by estimating the exchange stiffness constant of a $Co_{96-x}$—$Cr_x$—$Ta_4$ film and a $Co_{85-x}$—$Cr_x$—$Pt_{15}$ film based upon the result of measurement using Brillouin scattering.

Next, the read/write characteristics of these disks are evaluated using a magnetic recording disk read/write tester. A head used for recording is a thin film single magnetic pole head, the thickness of the magnetic pole is 0.3 μm, the shielding distance of a giant magnetoresistive effect (GMR) type head for read is 0.12 μm and a magnetic spacing during measurement is 0.03 μm. The signal to medium noise ratio (SN ratio) acquired by measuring a read signal in the linear recording density of 500 kFCI and integral medium noise is shown in Table 2 with that of R1 as a standard. As is clear from the table, a film according to this invention has excellent S/N characteristics except A1 and A5, as compared with the control sample R1.

TABLE 1

| Substrate temperature (° C.) | Co—Cr—Ta 250 | Co—Cr—Pt | | | | |
|---|---|---|---|---|---|---|
| | | 100 (A1) | 150 (A2) | 200 (A3) | 250 (A4) | 300 (A5) |
| Is (T) | 0.48 | 0.60 | 0.63 | 0.69 | 0.69 | 0.66 |
| Hc (kA/m) | 120 | 80 | 120 | 240 | 280 | 274 |
| Grain boundary Cr density (at %) | 22 | 15 | 16 | 17 | 19 | 21 |
| Exchange stiffness constant (A) (×10$^{-11}$ J/m) | 0.03 | 1.0 | 0.7 | 0.5 | 0.4 | 0.1 |

TABLE 2

| | R1 | R2 | A1 | A2 | A3 | A4 | A5 |
|---|---|---|---|---|---|---|---|
| S/N* (dB) | 0 | −5.8 | −3.4 | +2.5 | +6.7 | +8.3 | −0.2 |

*SN ratio in 500 kFCI of sample R1 is set to 0 dB.

Figure 3:
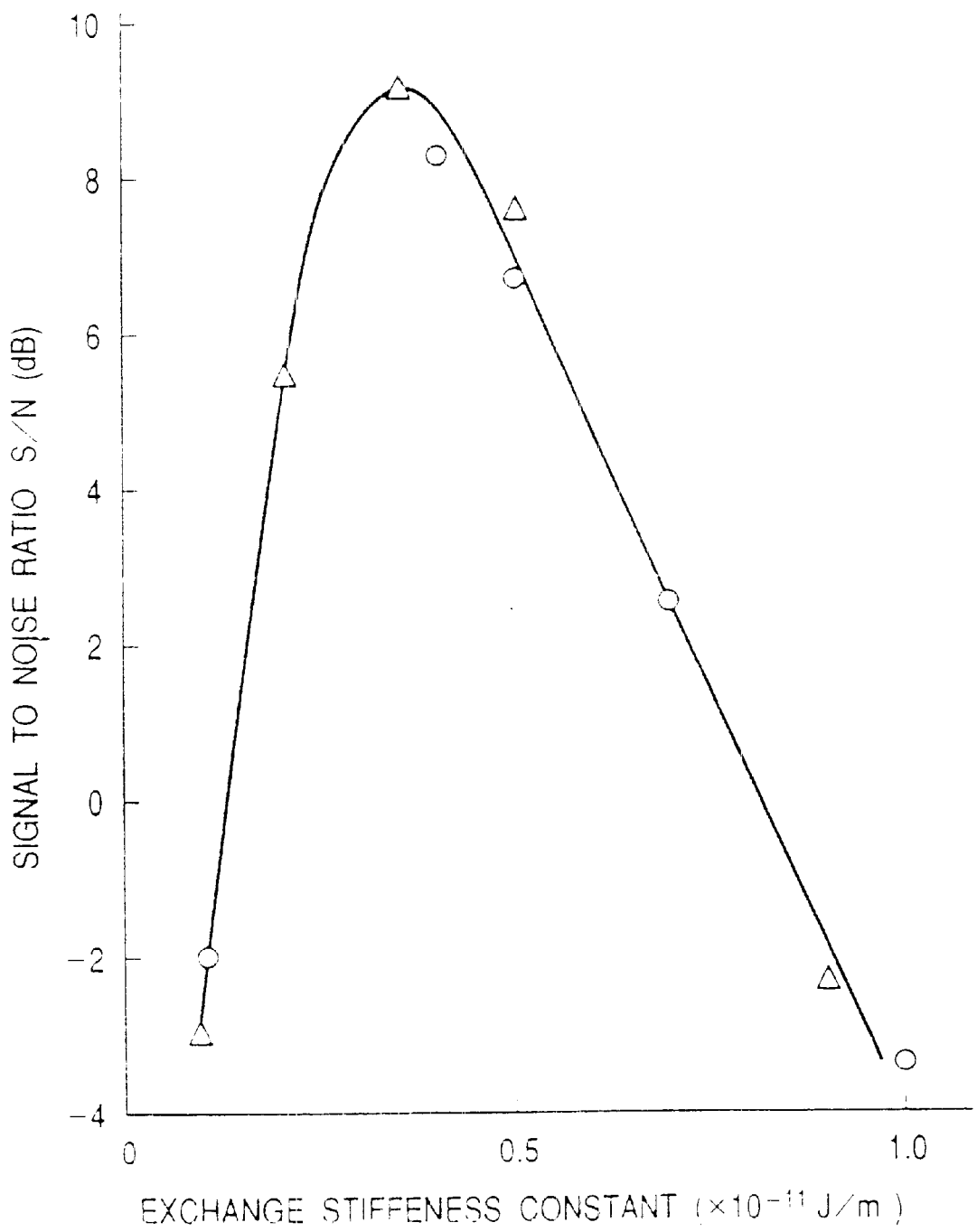
FIG. 3 shows relationship between signal to noise ratio and exchange interaction between grains.

FIG. 3 shows relationship between an exchange stiffness constant (A), which shows the strength of exchange interaction between grains in the second recording layer, and SN by a circle. In FIG. 3, relationship between an exchange stiffness constant and SN respectively for the fourth embodiment, which is described later, is also shown by a triangle. As clear from FIG. 3, an optimum value exists for an exchange stiffness constant (A) of the second recording layer and excellent S/N characteristics are acquired, compared with that in the sample R1 when A is in a range of $0.15 \times 10^{-11}$ J/m to $0.8 \times 10^{-11}$ J/m. FIG. 3 also shows that when A is in a range of $0.2 \times 10^{-11}$ J/m to $0.7 \times 10^{-11}$ J/m, particularly good S/N characteristics are acquired. On the other hand, in a control sample R2 formed by only a recording film in which exchange interaction exists, a value of A is $0.5 \times 10^{-11}$ J/m, media noise is large and SN ratio is the worst.

Second Embodiment

A magnetic recording medium having the sectional structure shown in FIG. 1 as in the first embodiment is produced by a d.c. magnetron sputtering method using a glass substrate 2.5 inches in diameter. After an Hf adhesive layer is formed, first, as an underlayer, Ni—Fe film (the percentage content of Fe: 20%) having high permeability characteristics is formed so that the Ni—Fe film has the thickness of 0.07 μm. Further, a first recording layer having the composition Co 78%, Cr 18% and Ta 4% and having the thickness of 15 nm is formed on the Ni—Fe film at the substrate temperature of 250° C. Next, a $Co_{83-x}$—$Cr_{17}$—$Pt_x$ second recording layer is laminated by the thickness of 10 nm at the same substrate temperature of 250° C. In total four types of disks are produced with the density X of Pt being 0%, 9.8%, 15.3% and 21.0% respectively. Further, a carbon passivation film 2 nm thick is formed on the surface. These samples are called B1 to B4 in order in which the density of Pt increases. The second recording layer has polycrystalline structure.

As the samples B1 to B4 are laminated films, the magnetic properties of the second recording layer cannot be measured separately. Thus, as in the first embodiment, a sample in which only the second recording layer is formed is produced. Table 3 shows its magnetic properties. As clear from the table, when the density of Pt is increased, a value K of an anisotropic constant is increased. In these samples, the density of Cr in a grain boundary is 18%.

Next, the read/write characteristics of the disks B1 to B4 are evaluated. Table 4 shows the result. It is known from Table 4 that S/N characteristics are improved when a value of K is in a range of $2.5 \times 10^5$ J/m$^3$ to $4.5 \times 10^5$ J/m$^3$. It is also verified that in the samples in this range, an exchange stiffness constant A is in a range of $0.3 \times 10^{-11}$ J/m to $0.7 \times 10$–$11$ J/m. A value K of an anisotropic constant is measured using a magnetic torque meter.

TABLE 3

| | | $Co_{(83-x)}$—$Cr_{17}$—$Pt_x$ | | | |
|---|---|---|---|---|---|
| | R1 | x = 0 (B1) | X = 9.8 (B2) | x = 15.3 (B3) | x = 21.0 (B4) |
| Is (T) | 0.48 | 0.63 | 0.59 | 0.55 | 0.54 |
| Hc (kA/m) | 120 | 104 | 208 | 336 | 344 |
| K (J/m$^3$) | 1.0 × 10$^5$ | 1.02 × 10$^5$ | 2.5 × 10$^5$ | 3.5 × 10$^5$ | 4.5 × 10$^5$ |

TABLE 4

| | | $Co_{(83-x)}$—$Cr_{17}$—$Pt_x$ | | | |
|---|---|---|---|---|---|
| | R1 | B1 | B2 | B3 | B4 |
| S/N* (dB) | 0 | −2.7 | +0.9 | +7.2 | +2.4 |

*SN ratio in 500 kFCI of sample R1 is set to 0 dB.

Third Embodiment

In this embodiment, an exchange stiffness constant of the first recording layer is varied. It will be described below that the exchange interaction of the first recording layer had better be weakened.

A magnetic recording medium having the sectional structure shown in FIG. 1 as in the first embodiment is produced by a d.c. magnetron sputtering method using a glass substrate 2.5 inches in diameter. After an Hf adhesive layer is formed, first, as an underlayer, Ni—Fe film (the percentage content of Fe: 20%) having high permeability characteristics is formed so that the Ni—Fe film has a thickness of 0.07 μm. Further, a first recording layer having the composition Co 78%, Cr 18% and Ta 4% and having the thickness of 15 nm is formed on the Ni—Fe film. At this time, the temperature of the substrate is varied among five values of 150° C., 200° C., 230° C., 250° C. and 300° C., and as a result the density of Cr segregated in a grain boundary is varied accordingly.

Afterward, a second recording layer having the composition of $Co_{68}Cr_{17}Pt_{15}$ at the substrate temperature of 250° C. is formed so that the second recording layer has the thickness of 10 nm and further, a carbon passivation film is provided. These sample disks are called C1 to C5 in order in which the substrate temperature when the first recording layer is formed becomes heigher. The second recording layer has polycrystalline structure. Table 5 shows magnetic properties when only the first recording layer is formed and a value of an exchange stiffness constant estimated based upon the density of Cr in a grain boundary.

Further, Table 5 shows the read/write characteristics of C1 to C5. As clear from the table, S/N characteristics exceeding the reference sample R1 are acquired in the sample disks formed at the substrate temperature of 230° C. or more. The density of Cr in a grain boundary of these sample disks is 21% to 29%, an exchange stiffness constant between grains is $0.05 \times 10^{-11}$ J/m or less and is substantially zero. The results show that he exchange interaction between grains of the first recording layer is required to be weakened.

TABLE 5

| Substrate | | $Co_{78}$—$Cr_{18}$—$Ta_4$ | | | | |
|---|---|---|---|---|---|---|
| temperature (° C.) | R1 250 | 150 (C1) | 200 (C2) | 230 (C3) | 250 (C4) | 300 (C5) |
| Grain boundary Cr density (at %) | 22 | 18 | 20 | 21 | 22 | 29 |
| Exchange stiffness constant (A) ($\times 10^{-11}$ J/m) | 0.03 | 0.25 | 0.15 | 0.05 | 0.03 | 0.007 |
| S/N* (dB) | 0 | −6.3 | −3.4 | +1.5 | +7.2 | +6.7 |

*SN ratio in 500 kFCI of sample R1 is set to 0 dB.

Fourth Embodiment

In this embodiment, an example an which a TbFe amorphous film used for recording media for magneto-optical recording is used as a second recording layer will be described.

A magnetic recording medium having the sectional structure shown in FIG. 1 as in the first embodiment is produced by a d.c. magnetron sputtering method using a glass substrate 2.5 inches in diameter. After an Hf adhesive layer is formed, first, as an underlayer, Ni—Fe film (the percentage content of Fe: 20%) having high permeability characteristics is formed so that the Ni—Fe film has the thickness of 0.07 μm. Further, a first recording layer having the composition Co 78%, Cr 18% and Ta 4% and having the thickness of 15 nm is formed on the Ni—Fe film at the substrate temperature of 250 ° C. Next, a $Tb_{16}$—$Fe_{63}$—$Co_{21}$ second recording layer is laminated at room temperature so that the second recording layer has the thickness of 10 nm. At this time, the pressure of argon gas is varied amang 0.4 Pa, 1.3 Pa, 2.6 Pa and 4.0 Pa and in total four types of disks are produced. Further, a carbon passivation film 2 nm thick is formed on the surface. These samples are called D1 to D4 in order in which the pressure of argon gas becomes higher.

Further, a sample is produced under the same conditions as D1 to D4 except that a second recording layer has a composition of $Tb_{16}$—$Fe_{42}$—$Co_{42}$ and the pressure of argon gas is 0.4 Pa. It is called D5. Also, as a control sample for comparison, a recording medium R1 is produced as in the first embodiment wherein a recording layer is formed by only a magnetic film having the same composition Co 78%, Cr 18% and Ta 4% as the first recording layer and a second recording layer is not provided.

As the samples D1 to D5 are laminated films, the magnetic properties of the second recording layer cannot be measured separately. Thus, as in the first embodiment, a sample in which only a second recording layer is formed is produced. Table 6 shows its magnetic properties. As clear from the table, in the samples D1 to D4, when the pressure of argon gas is increased, the value of coercivity Hc becomes slightly lower. Also, in the sample D5, the value of coercivity Hc becomes higher. An exchange stiffness constant (A) estimated based upon the width of a magnetic domain in demagnetized state has a tendency to decrease from $0.5 \times 10^{-11}$ J/m to $0.1 \times 10^{-11}$ J/m as the pressure of argon gas is increased in the samples D1 to D4. Conversely, in the sample D5 in which the density of Co is increased, an exchange stiffness constant (A) increases up to $0.9 \times 10^{-11}$ J/m.

Further, Table 6 shows the read/write characteristics of the samples D1 to D5. As described in the first embodiment, FIG. 3 shows by triangles relationship between an exchange stiffness constant and SN ratio. As clear from FIG. 3, it is desirable that the exchange stiffness constant (A) of the second recording layer is between $0.15 \times 10^{-11}$ J/m and $0.8 \times 10^{-11}$ J/m and it is preferable that the exchange stiffness constant is between $0.2 \times 10^{-11}$ J/m and $0.7 \times 10^{-11}$ J/m.

TABLE 6

| | | $Tb_{16}$—$Fe_{63}$—$Co_{21}$ | | | | $Tb_{16}Fe_{42}Co_{42}$ |
|---|---|---|---|---|---|---|
| Argon pressure (° C.) | R1 0.7 | 0.4 (D1) | 1.3 (D2) | 2.6 (D3) | 4.0 (D4) | 0.4 (D5) |
| Hc (kA/m) | 120 | 250 | 242 | 237 | 210 | 280 |
| Exchange stiffness constant (A) ($\times 10^{-11}$ J/m) | 0.03 | 0.5 | 0.35 | 0.2 | 0.1 | 0.9 |
| S/N* (dB) | 0 | +7.5 | +9.1 | +5.4 | −0.3 | −2.4 |

*SN ratio in 500 kFCI of sample R1 is set to 0 dB.

Fifth Embodiment

This embodiment is different from the above embodiments and it will be described below that further large effect is acquired when a first recording layer and a second recording layer are alternately laminated as multi-layers.

Figure 2:
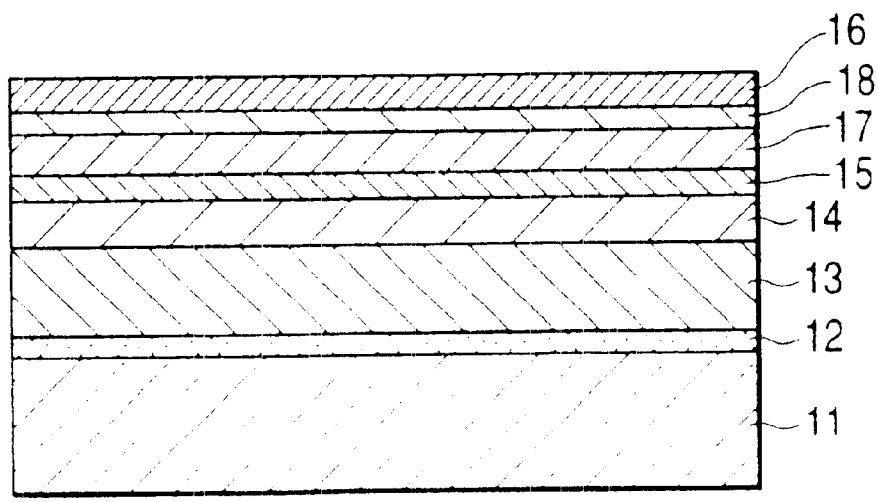
FIG. 2 shows the sectional view or perpendicular magnetic recording media equivalent to the fifth embodiment of the invention.

A magnetic recording medium having the sectional structure shown in FIG. 2 is produced by a d.c. magnetron sputtering method using a glass substrate 2.5 inches in diameter. After an Hf adhesive layer 12 is formed, first, as an underlayer 13, Ni—Fe film (the percentage content of Fe: 20%) having high permeability characteristics is formed so hat the Ni—Fe film has the thickness of 0.07 μm. Further, a first recording layer 14 having the composition Co 78%, Cr 18% and Ta 4% and having the thickness of 7 nm is formed on the Ni—Fe film at the substrate temperature of 250° C. Afterward, a second recording layer 15 having the composition of $Co_{70}Cr_{15}Pt_{15}$ is formed at the same substrate temperature so that the second recording layer has the thickness of 5 nm. Further, a third recording layer 17 having the same composition as the first recording layer is formed on the second recording layer so that the third recording layer has the thickness of 7 nm again. Next, a fourth recording layer 18 having the same composition as the second recording layer is laminated by 5 nm, and a recording film composed of, in total, four layers is produced. Further, a carbon passivation film 16 having the thickness of 2 nm is formed on the surface. The second and fourth recording layers have polycrystalline structure.

In the measured read/write characteristics of this sample disk, SN ratio is higher by approximately 2 dB, than in a sample disk B3 having substantially the same composition. Thus the favorable effect of providing multilayers was shown.

Sixth Embodiment

In this embodiment, it will be described below that perpendicular magnetic recording media according to this invention have excellent S/N characteristics and are also excellent in thermal fluctuation resistance characteristics.

Figure 4:
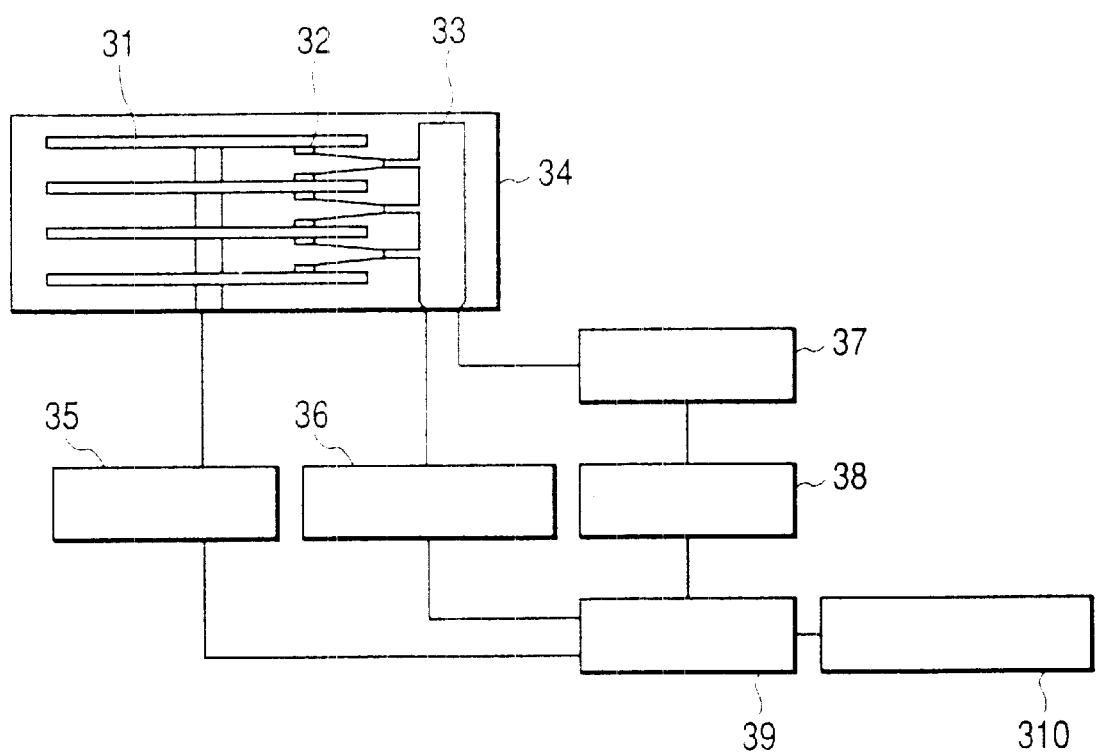
FIG. 4 is a schematic drawing showing one embodiment of a magnetic recording disk unit according to the invention.

FIG. 4 shows one embodiment of a magnetic recording disk unit according to this invention. Magnetic disks 31 are attached to a spindle in a head disk assembly 34 and are rotated by a media driving system (a motor) 35 at high speed. For these magnetic disks 31, disk samples A2 to A4, B2 to B4, C3 to C5 and D1 to D3 produced in the embodiments above are used. A magnetic head 32 for reading/writing a signal is arranged over the magnetically recorded surface of each disk and one of them functions as a servo head. The magnetic head 32 is moved substantially in the radial direction of the magnetic disk by a head driving system 36 via an actuator 33. Further, a reading/writing system 37 for reading/writing data, a signal processing system 38 for processing a signal, a control system 39 for controlling these and the driving system, an interface 310 for exchanging data with a host and others are provided to this unit.

When recording is performed using this magnetic recording disk unit and a thin film single magnetic pole head under a condition of the linear recording density of 900 kFCI and read back is performed by the GMR head the track width of which is 0.5 μm, sufficiently high read output and low noise characteristics can be acquired in both cases and the signal to noise ratio (S/N) of 23 dB or more can be acquired. These specifications are equivalent to the areal recording density of 40 Gb/in² or more.

Also, it is found that even if 100 hours or longer time elapse after a signal is recorded, read output is reduced by less than 1%, and thus an excellent property is also acquired in thermal stability. On the other hand, SN ratio under the same recording condition of the disk R1 produced for the comparison sample is 17 dB or less and the signal deterioration factor after 100 hours is 8.5%. In the case when the disk R2 is used, recording in the linear recording density of 900 kFCI is impossible and no read signal can be detected.

As described above, according to this invention, perpendicular magnetic recording media can be provided wherein large read output and low noise characteristics are also acquired in a large recording density region, a great improvement of signal to noise ratio (S/N) is enabled and thermal fluctuation resistance characteristics are greatly improved and which can be easily manufactured. A magnetic recording apparatus which has excellent signal to noise ratio at a high recording density region and has stable characteristics resistant to thermal fluctuation can also be provided.

What is claimed is:

1. Perpendicular magnetic recording media, comprising:

a non-magnetic substrate;

a first recording layer provided on the non-magnetic substrate and provided with perpendicular magnetic anisotropy;

a second recording layer laminated on the first recording layer and provided with perpendicular magnetic anisotropy, wherein:

the exchange stiffness constant showing the magnitude of magnetic exchange interaction between grains of the first recording layer is $0.05 \times 10^{-11}$ J/m or less;

the exchange stiffness constant showing the magnitude of magnetic exchange interaction between grains of the second recording layer is a range of $0.15 \times 10^{-11}$ J/m to $0.8 \times 10^{-11}$ J/m;

a sum of a thickness of the first recording layer and thickness of the second recording layer is 10 to 100 nm; and a ratio of the thickness of the second recording layer to the thickness of the first recording layer is in a range of 0.5 to 1.0.

2. Perpendicular magnetic recording media according to claim 1, wherein the magnetic anisotropy constant of the second recording layer is a range of $2.5 \times 10^5$ J/m³ to $4.5 \times 10^5$ J/m³.

3. Perpendicular magnetic recording media according to claim 1, wherein the second recording layer has polycrystalline structure.

* * * * *